United States Patent [19]
Matthews

[11] Patent Number: 5,471,785
[45] Date of Patent: Dec. 5, 1995

US005471785A

[54] METHOD FOR IMPROVING THE CHEMICAL STABILITY OF LIVING ORGANISMS

[76] Inventor: Mehlin D. Matthews, P.O. Box 24, Saratoga, Calif. 95071-0024

[21] Appl. No.: 267,660

[22] Filed: Jun. 29, 1994

[51] Int. Cl.$^6$ .............................. A01G 7/02; A01K 29/00
[52] U.S. Cl. ...................... 47/58; 47/17; 47/59; 119/174
[58] Field of Search ................................... 47/58, 59, 17, 47/1.01; 119/174

[56] References Cited

U.S. PATENT DOCUMENTS

| 3,854,240 | 12/1974 | Oldham | 47/1.4 |
|---|---|---|---|
| 5,036,618 | 8/1991 | Mori | 47/1.1 |

OTHER PUBLICATIONS

I. Asimov, Journal of Chemical Education, v32, pp. 84–85, 1955.
S. N. Goud, O. S. Reddi and P. P. Reddy, Experientia, v37, pp. 948–949, 1981.
G. H. Keswani, Speculations in Science and Technology, v9, n4, pp. 243–244, 1986.
J. L. Fail and Z. S. Wochok, "Soybean Growth on Fly Ash–Amended Strip Mine Soils", Plant and Soil, v48, pp. 473–484, 1977.
B. B. McInteer and T. R. Mills, "Superheavy Isotope Enrichment Using A Carbon Isotope Enrichment Plant", Separation Science and Technology, v26, n5, pp. 607–617, 1991.
Webster's Ninth New College Dictionary, p. 1146, 1991.
J. L. Fail Jr. (1987) Plant and Soil 101:149–150.

*Primary Examiner*—David T. Fox
*Assistant Examiner*—Elizabeth F. McElwain

[57] ABSTRACT

A method for improving the chemical stability of a living organism by reducing the occurrence carbon-14 beta-decay in the organism. Organic nutrients with a carbon-14 content lower than that found in natural are provided to the organism. In the case of photosynthetic organisms, carbon dioxide produced from subterranean carbon sources is the major nutrient. Organic nutrients for non-photosynthetic organisms are synthesized directly from subterranean sources of carbon, or are derived from photosynthetic organisms that have been produced with a reduced carbon-14 content.

15 Claims, No Drawings

METHOD FOR IMPROVING THE CHEMICAL STABILITY OF LIVING ORGANISMS

BACKGROUND OF THE INVENTION

1. Field of the Invention

This invention relates to a method for improving the stability of living organisms through the reduction of carbon-14 in the organism.

2. Description of the Prior Art

The radioactive decay of carbon-14 that is contained in the DNA of living organisms is known to cause structural and chemical changes local to the site of the decay event. Isaac Asimov was one of the first to discuss this phenomenon [I. Asimov, Journal of Chemical Education, v32, pp 84–5, 1955]. Asimov revisited the subject in a subsequent book ["The Relativity of Wrong" Isaac Asimov, Doubleday, New York, 1988]. Asimov focused on the β-decay of carbon-14 atoms in the DNA of a living organism and proposed that the effect of carbon-14 decay could be investigated by substantially increasing the amount of carbon-14 in a living organism and observing the impact on mutations. Subsequently, a considerable amount of research has been done on the effects of increased carbon-14 content on the health of a variety of living organisms. Increased mutations and cases of increased mortality in offspring have been observed. Asimov and others have addressed the impact of carbon-14 increases but the reduction of carbon-14 in living organisms has not been addressed in spite of the recognized genetic damage produced by the radioactive decay of carbon-14. By definition, the organic molecules in a living organism are unstable due to the presence of carbon-14. Although the time of decay of a particular carbon-14 atom cannot be predicted, the large number of carbon atoms in a living organism ensures that the number of decay incidents will be in proportion to the total number of carbon-14 atoms in the organism. The instability of the carbon-14 found in a living organism imparts instability to that organism.

The β-decay of carbon-14 releases 156,000 electron-volts of energy. Considering that the bond energy between a carbon atom and an atom of hydrogen, oxygen, nitrogen, or carbon is less than 4 electron volts; the energy released through β-decay is sufficient to disrupt thousands of chemical bonds in the vicinity of the decay event. The disruption of chemical bonds can produce free radicals or other reactive species that are capable of producing changes in DNA or RNA of the organism. At the very least, a carbon atom is changed to a nitrogen atom.

In addition to the disruption of the genetic material produced in living organisms by the β-decay of carbon-14, the potential impact of beta decay upon the thought processes in humans has been discussed by Keswani [G. H. Keswani, Speculations in Science and Technology, v9, n4 pp 243–4, 1985]. Keswani estimates that about 3,600 electrons per minute per kilogram are produced in the brain.

Virtually all living organisms contain carbon-14. The transmutation of nitrogen-14 to carbon-14 and the subsequent oxidation of this carbon to carbon dioxide in the upper atmosphere provides a source of carbon that readily available to the photosynthetic organisms. The transmutation process is essentially the addition of a neutron and the ejection of a proton by a nitrogen-14 atom through interaction with cosmic rays. Photosynthetic organisms are the basis of the food chain for the vast majority of living organisms on earth. If this atmospheric source of carbon-14 were not available, terrestrial carbon-14 would have all but disappeared long ago due to its relatively short half-life of 5,730 years.

Although the prior art has acknowledged that the radioactive decay of carbon-14 has an impact on living organisms and that increased carbon-14 content can produce an increase in mutations in living organisms, the prior art has not provided a method for the elimination or reduction of carbon-14 in a living organism.

OBJECTS AND ADVANTAGES

It is thus an object of the present invention to provide a method for producing organisms with a substantially lower carbon-14 content than that of organisms found in nature, thereby improving the genetic stability of the organism.

A further object of the invention is to produce nutrients that are low in carbon-14 content from subterranean sources of carbon and hydrocarbons with low carbon-14 content.

Another object of the invention is the use of photosynthetic organisms with reduced carbon-14 content, in whole or in part, as a nutrient source for non-photosynthetic organisms.

Biotechnological advances of the last few decades have resulted in considerable investment in the pursuit of genetically engineered organisms. One particular area of genetic engineering involves the modification of bacteria to enable the bacteria to produce a desired substance. The total investment in such an organism in terms of dollars per gram mass can easily exceed billions of dollars when an investment of a few millions of dollars results in a few milligrams or less of engineered bacteria. Under favorable circumstances, a relatively small number of engineered micro-organisms can be cultured to produce a population increase of many orders of magnitude. The growing population is subject to a number of mutagenic influences such as cosmic rays, free radicals and the local decay of radioisotopes. Since simple organisms such as bacteria lack the sophisticated means for repair and control of genetic mutation found in higher organisms, external means for stabilizing their genetic constitution must be considered. The present invention offers a means for reducing one specific mutagenic agent, i.e. carbon-14.

It is important to note that in the history of life on the planet Earth, all living organisms have been subjected to the influence of carbon-14. The D-decay of carbon-14 has been an integral part of life itself. The processes of development, metamorphosis, and aging are guided by the genetic constitution of the organism and is thus influenced by carbon-14. The specific reduction of carbon-14 in living organisms offers a valuable tool for understanding the fundamental mechanisms of life.

DETAILED DESCRIPTION OF THE INVENTION

The invention provides a method for improving the genetic stability of a living organism by reducing the amount of carbon-14 in the organism. The basis of the method is to reduce the assimilation of carbon-14 by the organism by reducing the exposure of the organism to carbon-14 compounds that it is capable of absorbing or assimilating into its structure. Assimilation by an object is defined here as the process of absorbing and integrating a substance into the structure of the object through a chemical reaction. In this sense a photosynthetic organism assimilates carbon dioxide, but does not assimilate argon. A mammal can absorb a carbon dioxide molecule from its environment and perhaps fix it to hemoglobin in an erythrocyte, but the carbon dioxide does not become a vital constituent of the mammal.

The reduction of genetic mutation in an organism through the reduction of carbon-14 requires that the absorption or assimilation of carbon-14 and carbon-14 containing compounds be reduced. For photosynthetic organisms this requires a hermetic environment since the earth's atmosphere is a natural source of carbon-14 and the bulk of the carbon in a photosynthetic organism is derived from the carbon dioxide in its environment.

In the method of the invention as applied to photosynthetic organisms, a hermetic environment containing sufficient inorganic nutrients is provided with a source of carbon dioxide and a source of light suitable for photosynthesis. The carbon dioxide provided is extremely low in carbon-14 content. The natural concentration of carbon-14 is about 2 atoms in one trillion. The carbon-14 concentration in the carbon dioxide provided should be at most one one hundredth of this level, or approximately 2 atoms in $10^{14}$ and preferably less than one atom in $10^{18}$. The hermetic environment is required to provide a barrier to natural carbon dioxide, i.e. carbon dioxide that has not been produced from the oxidation of carbon with a greatly reduced carbon-14 content.

Although any source of carbon can be processed by isotopic separation techniques to reduce the carbon-14 content, (isotopic separation has been used as a step in producing essentially pure carbon-12 diamonds) it is preferable to use subterranean sources for economic reasons. Compared to the geologic time scale, the carbon-14 half-life of 5,730 years is a relatively short period of time. In 250,000 years a mass of carbon-14 will have decayed to less than one trillionth of its original mass. Since most subterranean carbon deposits are millions of years old, they can be considered virtually free of their original carbon-14. For example, most of the coal deposits in the eastern United States of America are roughly 200 million years old.

It is not sufficient that the carbon source be old enough so that the initial carbon-14 has decayed to an insignificant level. The carbon source (e.g. coal) must be isolated from radiation sources that have the capability for inducing nuclear reactions that would produce carbon-14. Subterranean carbon sources such as graphite, diamonds, natural gas, coal, and petroleum that are of sufficient age and obtained from sufficient depth below the earth's surface will generally have a low carbon-14 content due to the decay of the initial carbon-14 content and the lack of exposure to the atmospheric source of carbon-14. The greater the age of the deposit, the lower the residual carbon-14 content. The greater the depth of the deposit, the less exposure to the atmospheric source of carbon-14 and the greater the shielding from extra-terrestrial radiation. It is also preferred that the subterranean carbon be obtained from a source that has been exposed to a minimum of radiation produced by the decay of radium, uranium and other radioactive elements in the earth's crust. Finally, the source should not have been exposed to radiation from man-made fission or fusion bombs or other such devices.

The recovery of the subterranean carbon must be done with a minimum of contact with the atmosphere. Liquid and gas sources can be transported from the wellhead in hermetic containers or pipes and introduced into a chemical reactor without exposure to the atmosphere. Solid sources such as graphite or coal must be handled differently. Solid carbon sources that have been exposed to the atmosphere face contamination through two main routes. One is the direct absorption or adsorption of carbon-14 containing compounds from the atmosphere in the vapor state, and the other is contamination by organisms that are capable of assimilating carbon-14 compounds from the air. The carbon-14 compounds that are acquired by the former route can be removed by heating in a vacuum atmosphere. The contamination by latter route is not so easily removed since a vacuum heating would decompose the organisms and leave some solid residue. The recovery and storage of solid carbon sources should thus be done in a manner that minimizes contact with organisms that are capable of fixing carbon compounds from the atmosphere. Vacuum heat treatment should be done shortly after recovery and the carbon should be stored in vacuum or an inert atmosphere.

The conversion of the low carbon-14 carbon to organic nutrients can easily be done in a closed system. Carbon dioxide can be produced by reacting the carbon source directly with oxygen and cryogenically separating the carbon dioxide from the reaction products, or by purifying the carbon source by thermal decomposition prior to reacting with oxygen. Hydrocarbon sources provide a rich selection of precursors for the synthesis of sugars, amino acids and other compounds that can be used as organic nutrients for non-photosynthetic organisms. An organic nutrient is defined here as an organic compound that is capable of being assimilated into a living organism.

The hermetic environment and photosynthetic organisms contained therein constitute a system in which the original carbon-14 content is determined by the initial organic mass of the system. The organic mass consists of selected photosynthetic organisms and/or seeds or other precursors to mature organisms, as well as a residual amount of bacteria and non-living organic matter.

The system functions as a hermetic greenhouse (or in the case of an environment that is substantially aqueous, an aquarium) in which there is minimal exchange of carbon compounds with the outside world. The type of photosynthetic organisms selected for the system will depend upon the ultimate application for the biomass that is produced. An aqueous environment has the advantage of functioning with small organisms such as algae that have high growth rates and can be harvested through filter techniques that minimize perturbations to the system. As the biomass increases and is periodically harvested, the content of carbon-14 in the system is decreased. For a system that is initiated with seeds or a small number of mature plants that are capable of reproduction, the dilution of the biomass carbon-14 is rapid. In a period of months, a few grams of biomass can easily attain a thousand-fold increase in mass. By removing all of this mass save for a small fraction, and repeating the process, the carbon-14 concentration is reduced to a level far below that found in nature in just a few cycles.

Although a greenhouse on the surface of the earth can be adapted to provide an environment with a reduced carbon-14 content and still utilize solar radiation for photosynthesis, a greater reduction in carbon-14 can be achieved by massive shielding from the solar radiation and the atmosphere. A subterranean greenhouse or similar massively shielded enclosure would of course require artificial illumination. Establishing an artificially illuminated greenhouse in a subterranean coal mine eases the burden of avoiding atmospheric contamination and simplifies the logistics of nutrient supply to the greenhouse.

Ultimately, the carbon-14 content is dominated by the residual carbon-14 in the carbon dioxide source and smaller contributions from external diffusion of carbon compounds and cosmic ray interactions with the nitrogen in the system. In addition there is some degree of carbon-14 contamination associated with the access to the system. The access associated contamination can be controlled by the use of airlocks and purging. The hermetic enclosure must be constructed of materials that have a reasonably low permeability to carbon monoxide, carbon dioxide and other organic vapors. If organic components such as polycarbonate or acrylic windows are used, they must be prevented from decomposing to release carbon-14 into the hermetic environment. Also, plastics used in the construction should have low volatile content since outgassing solvent vapors are a source of contamination. Metals and ceramics (including glass) are the preferred materials of construction; however seals for airlocks and expansion joints to take up thermal expansion mismatch are best constructed of plastics. Silicon based polymer materials are preferred for seals and expansion joints since they have a reduced carbon content. For any polymer system that is cured in situ, the reaction products must be considered (e.g. acetic acid in the curing of some silicone rubbers).

For non-photosynthetic aerobic organisms, the invention is practiced by providing the organism with organic nutrients obtained from reduced carbon-14 photosynthetic organisms or synthesized directly from subterranean carbon that is extremely low in carbon-14 content. For maximum reduction of carbon-14, aerobic organisms can be raised in a hermetic environment similar to that used for photosynthetic organisms.

While photosynthetic organisms must be kept in a hermetic environment to avoid contact with atmospheric carbon dioxide, non-photosynthetic organisms with a reduced carbon-14 content can be produced in the terrestrial atmosphere since carbon dioxide (the major source of carbon in the atmosphere) is not metabolized by non-photosynthetic organisms. Some non-photosynthetic organisms such as bacteria can easily be kept in a fully controlled environment, whereas organisms such as mammals are more difficult to isolate from all sources of carbon-14. Although diffusion, ingestion and inhalation are paths for contamination by gases and particulates, these sources are small compared to the quantity of carbon that is provided in nutrients or food. A mammal that is raised in a terrestrial atmosphere but provided with reduced carbon-14 food will have a significantly lower carbon-14 content than a normal mammal, although the carbon-14 content will still be higher than that of a mammal raised in a hermetic environment.

Nutrients for a non-photosynthetic organism can be synthesized from subterranean carbon sources or be obtained from photosynthetic organisms that have been produced in a reduced carbon-14 environment. Certain organic nutrients can be produced on a large scale more economically by direct synthesis from subterranean carbon sources; however, other complex nutrients is easier to produce by the propagation of photosynthetic organisms in a reduced carbon-14 environment. As with the carbon dioxide provided to photosynthetic organisms, the organic nutrients provided to aerobic organisms should have a carbon-14 content less than 2 atoms in $10^{14}$ and preferably less than one atom in $10^{18}$.

The invention described above provides a means of reducing the carbon-14 content of a living organism and thereby improving the genetic stability of the organism. The use of subterranean carbon provides an immense source of low carbon-14 material that can be utilized on a large scale. The increase in genetic stability is the main benefit of the invention; however, the benefits of carbon-14 reduction improve the stability of all organic compounds in an organism, and thus the invention is not to be construed as being limited to improving genetic stability.

I claim:

1. A method for reducing the amount of radioactive decay of carbon-14 contained in a living organism, said method comprising the providing of organic nutrients to said living organism wherein said organic nutrients have a carbon-14 content of less than 2 atoms of carbon-14 per $10^{14}$ atoms of carbon.

2. The method of claim 1 wherein said organic nutrients are derived principally from a subterranean source of carbon.

3. The method of claim 1 wherein said carbon-14 content is less than 1 atom in $10^{18}$ atoms of carbon.

4. The method of claim 1 wherein said living organism is capable of photosynthesis and said organic nutrients comprise carbon dioxide.

5. The method of claim 4 further including an enclosure means serving to reduce exposure of said living organism to carbon dioxide that has not been produced from the oxidation of carbon with a greatly reduced carbon-14 content.

6. The method of claim 4 wherein said organic nutrients are derived principally from subterranean sources of carbon.

7. The method of claim 5 wherein said organic nutrients are derived principally from subterranean sources of carbon further including a means of artificial illumination for assisting photosynthesis.

8. The method of claim 5 further including a means of artificial illumination for assisting photosynthesis.

9. The method of claim 8 wherein said enclosure is located in close proximity to a subterranean source of carbon.

10. The method of claim 5 wherein said enclosure means encloses a substantially aqueous environment.

11. The method of claim 1 wherein said living organism is not capable of photosynthesis.

12. The method of claim 11 wherein said organic nutrients are synthesized principally from a subterranean source of carbon.

13. The method of claim 11 wherein said organic nutrients are derived from photosynthetic organisms that have a carbon content of less than 2 atoms of carbon-14 per $10^{14}$ atoms of carbon.

14. The method of claim 11 wherein said living organism is provided with an enclosure means to reduce contact with carbon dioxide that has not been produced from the oxidation of carbon with a greatly reduced carbon-14 content.

15. The method of claim 11 wherein said organic nutrients are derived from photosynthetic organisms that have a carbon content of less than 2 atoms of carbon-14 per $10^{18}$ atoms of carbon.

* * * * *